United States Patent [19]

Pinder et al.

[11] Patent Number: 5,742,904
[45] Date of Patent: Apr. 21, 1998

[54] METHOD OF PROVIDING EMERGENCY ALARM SUPPORT VIA AN ALTERNATIVE RADIO COMMUNICATION SYSTEM

[75] Inventors: Ellis A. Pinder, Davie; Charles P. Schultz, Hialeah, both of Fla.

[73] Assignee: Motorola, Inc., Schaumburg, Ill.

[21] Appl. No.: 676,784

[22] Filed: Jul. 8, 1996

[51] Int. Cl.$^6$ .................................................... H04B 7/00
[52] U.S. Cl. ........................................ 455/404; 455/521
[58] Field of Search ................................ 455/404, 432, 455/433, 435, 521

[56] References Cited

U.S. PATENT DOCUMENTS

| | | | |
|---|---|---|---|
| 5,095,529 | 3/1992 | Comroe et al. | 455/16 |
| 5,392,458 | 2/1995 | Sasuta et al. | 455/54.1 |
| 5,463,675 | 10/1995 | Gerszberg | 455/432 |
| 5,465,388 | 11/1995 | Zicker | 455/404 |
| 5,596,625 | 1/1997 | LeBlanc | 455/404 |

*Primary Examiner*—Amelia Au
*Attorney, Agent, or Firm*—Andrew S. Fuller

[57] ABSTRACT

A subscriber unit (127), operating within a first communication system (120) receives emergency alarm support from a second, operationally independent, communication system (140), that provides support through a guest access mode. The subscriber unit (127) transmits a message to the second system (570), the message including the emergency alarm call and supplementary information that identifies the source of the emergency alarm call. The second system (140) receives the message (610), determines source identification information for the emergency alarm call (620), and communicates the emergency alarm call to the first system based on the source identification information (630). Preferably, the subscriber unit (127) maintains an emergency resource list (322) for selecting recipients for handling emergency alarm calls.

20 Claims, 4 Drawing Sheets

| SYSTEM | EMERGENCY IDENTIFIER | EMERGENCY CALL ACKNOWLEDGE STATUS | SYSTEM RATING |
|---|---|---|---|
| 0137 | 101 | Y | GOOD |
| 0010 | 522 |  | FAIR |
| 2000 | 711 |  | POOR |

METHOD OF PROVIDING EMERGENCY ALARM SUPPORT VIA AN ALTERNATIVE RADIO COMMUNICATION SYSTEM

TECHNICAL FIELD

This invention relates in general to radio communications systems, and more particularly, to the provision of emergency alarm support for a subscriber unit operating within a particular radio communication system.

BACKGROUND

Radio communication systems, such as those designed for public safety, often provide support for emergency alarm calls. On a typical subscriber unit operating within such a system, an emergency button is provided which initiates an emergency call upon depression. A radio communication system may provide dedicated communication resources for supporting an emergency call. Such resources may include designated emergency channels, emergency signaling schemes, and personnel and procedures for responding to an emergency call.

A radio communication system typically provides service over a particular coverage range. Subscriber units operating within the coverage range usually communicate with a central controller that provides overall operational control and management of the communication system. In an emergency situation, a subscriber unit ordinarily transmits an emergency alarm call targeted at the central controller. However, for a variety of reasons, the subscriber unit might be unable to complete an emergency call to the central controller. For example, the subscriber unit might be out of range of the central controller, or the central controller may be unable to receive and process the call because of down time, or otherwise.

The radio communication system may exist in a geographic region with neighboring radio communication systems. Oftentimes, such neighboring communication systems are operationally independent, but may be within communication range of a subscriber unit of another communication system. For example, a police officer out of radio contact with her own radio communication system may be within communication range of a neighboring police system. It would be desirable to foster an environment in which a neighbor communication system may recognize an emergency call from a subscriber unit of another communication system. However, operational differences between systems may preclude such cooperation. Even when operational similarities provide an opportunity for such intersystem emergency support, the administrative burden associated with managing information from a neighbor communication system may preclude such considerations.

It is desirable to provide a communication environment which provides intersystem emergency alarm call support. Such communication environment should provide additional robustness for supporting emergency calls while minimizing the impact of additional administrative burdens.

DETAILED DESCRIPTION OF THE PREFERRED EMBODIMENT

The present invention provides for a communication environment in which a subscriber unit operating within a first communication system may receive emergency alarm support from a second communication system operating independently of the first communication system. At the subscriber unit, a secondary or neighbor communication system is selected to be a target recipient of an emergency call as a backup when communication with a primary or home communication system is not available. A corresponding message is transmitted to the secondary communication system using a guest access mode, which message includes guest identification information and supplementary information, if needed, to identify the source of the emergency alarm call. The secondary communication receives the message from the subscriber unit and determines source identification information, including the identity of the primary communication system. The secondary communication system then communicates with the primary communication system to convey the emergency information, including identification information associated with the subscriber unit.

Figure 1:
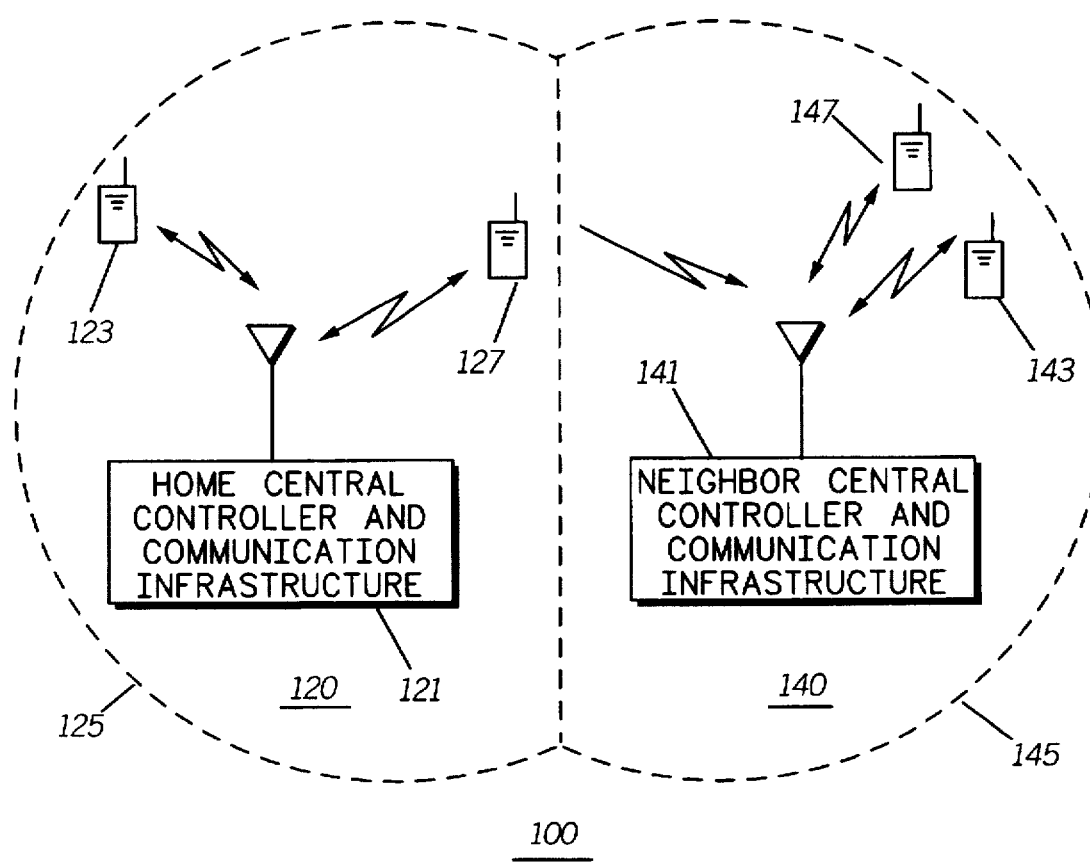
FIG. 1 shows a communication environment having neighboring communication systems operating independently, in accordance with the present invention.

FIG. 1 depicts a communication environment 100 having two neighboring communication systems 120, 140, with overlapping coverage regions 125, 145. A first communication system 120, also referred to herein as a home communication system, includes a central controller and communication infrastructure 121, and subscriber units 123, 127 operating within its coverage area or service range 125. The second communication system 140, also referred to herein as a neighbor communication system, includes a central controller and communication infrastructure 141, and subscriber units 143, 147 operating within its coverage area or service range 145. The neighboring communication systems 120, 140 are operationally independent of each other, and thus function as independent systems which have no operational links therebetween. In the preferred embodiment, both communication systems 120, 140 operate in trunked access mode, but may alternatively have different operational characteristics. For example, one system may be trunked while the other conventional in mode of operation.

According to the present invention, both communication systems 120, 140 provide emergency alarm support for their respective subscriber units through direct or indirect means. Additionally, at least one communication system 140 provides emergency alarm support for subscriber units operating within a second communication system 120. Such emergency alarm support is provided through a guest access mode which enables a subscriber unit operating in one communication system to transmit an emergency alarm call to another communication system when within communication range of that other communication system. In the examples shown, subscriber unit 127 operating within communication system 120 is able to receive emergency alarm support from a neighbor communication system 140.

Figure 2:
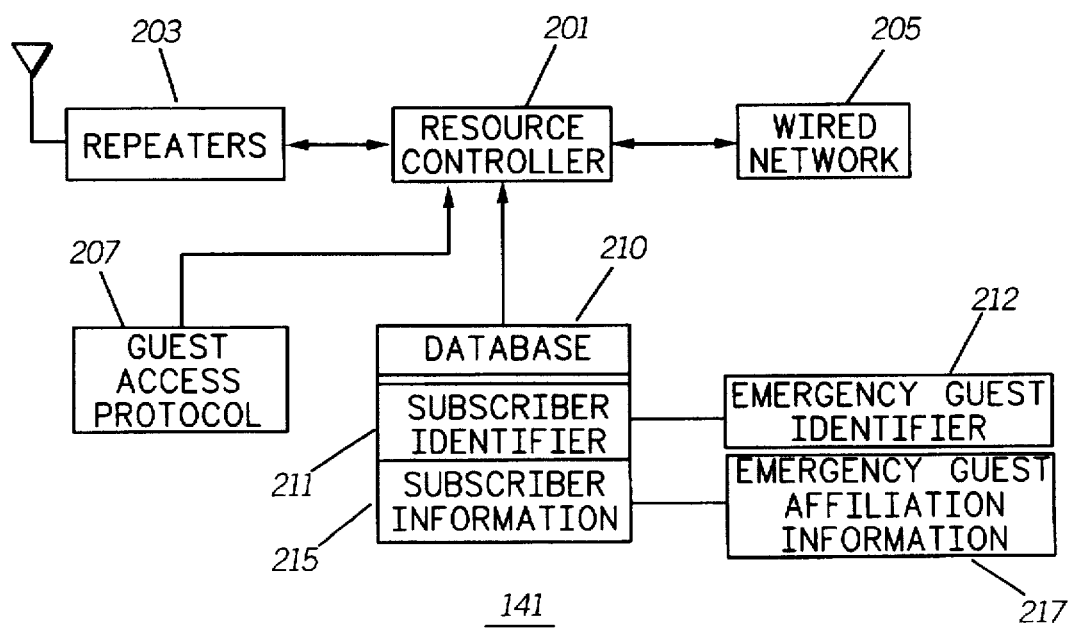
FIG. 2 is a block diagram of important components of a radio communication system, in accordance with the present invention.

FIG. 2 is a block diagram of a central controller and communication infrastructure 141 that provides emergency alarm support in guest access mode, in accordance with the present invention. The central controller and communication infrastructure 141 includes a resource controller 201 that is coupled to repeaters 203 and a wired network 205. The resource controller 201 functions to control allocation of communication resources for the benefit of the supported subscriber units. Communication resources may include frequency pairs, such as receive and transmit operations, communication links, system control information, and the like. The resource controller 201 provides access to services such as talk group affiliation, emergency alarm support, telephone interconnection, and the like. The resource controller 201 may also communicate with other entities via the wired network 205, such as a telephone network or wide area network, or any other suitable communication means. Wireless communications are conducted via the repeaters 203, under control of the resource controller 201, which services resource allocation requests and conveys resource grant information. The repeaters 203 are ordinarily geographically dispersed and help to define the coverage area for the communication system.

The resource controller 201 operates using a database 210 that includes subscriber identification information 211, and other subscriber information 215. In the preferred embodiment, the subscriber identification information may correspond to an emergency guest identifier 212. Similarly, the subscriber information may correspond to emergency guest affiliation information 217 or other useful information. A guest access protocol 207 controls the guest access mode for an alien subscriber unit wishing to place an emergency alarm call via the communication system.

In the preferred embodiment, the emergency guest identifier identifies a group of subscriber units belonging to a particular system, or having a particular grouping, or otherwise having a common identity. The emergency guest affiliation information 217 may associate this emergency guest identifier (ID) 212 with such system, grouping, or common identity, and may provide contacts, and other information needed to support a particular emergency situation. In practice, the emergency guest ID may represent all subscriber units of a particular police department or other public safety operation. The guest access protocol 207 determines the procedural steps for handling emergency calls received from other communication systems.

Figures 3, 4:
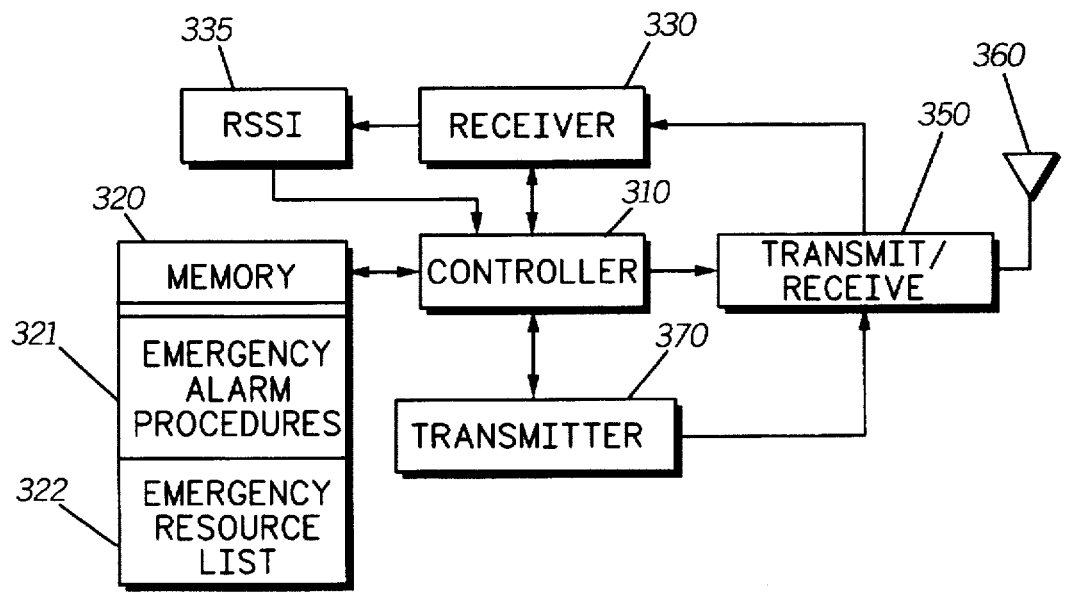
FIG. 3 is a block diagram of a transceiver operating as a subscriber unit in the communication environment of FIG. 1, in accordance with the present invention.
FIG. 4 is a block diagram depicting a prioritized emergency list as used in the transceiver of FIG. 3, in accordance with the present invention.

FIG. 3 is a block diagram of a transceiver, such as subscriber unit 127 which operates as within communication system 120, in accordance with the present invention. In the preferred embodiment, the transceiver 127 is a two-way radio communication device having circuitry for communicating over radio frequency channels. The transceiver 127 includes a controller 310 that provides operational control for the various transceiver functions, including receive and transmit operations. For receive operations, a transmit/receive switch 350 is engaged to selectively coupled an antenna 360 to a receiver 330. Signals from the receiver 330 are coupled to a received signal strength indicator (RSSI) block 335, which provides an input to the controller 310. For transmit operations, the transmit/receive switch 350 is engaged to couple a transmitter 370 to the antenna 360. The controller 310 operates from instructions and data stored in a memory 320. According to the present invention, the memory includes emergency alarm procedures 321, and a dynamically maintained emergency resource list 322. Preferably, the emergency resource list 322 is maintained using information derived from RSSI data or other signal quality measurements, and other information characterizing systems on the emergency resource list.

FIG. 4 is a block diagram of a prioritized sample emergency resource list, in accordance with the present invention. The emergency resource list 322 includes information on available communication systems 403, emergency identification information 405, emergency call acknowledge status 407, and system rating 409 for prioritizing purposes. Preferably, the system rating is periodically updated by monitoring RSSI information for available systems. The emergency call acknowledge status 407 is dynamically maintained and used as described below.

Figure 5:
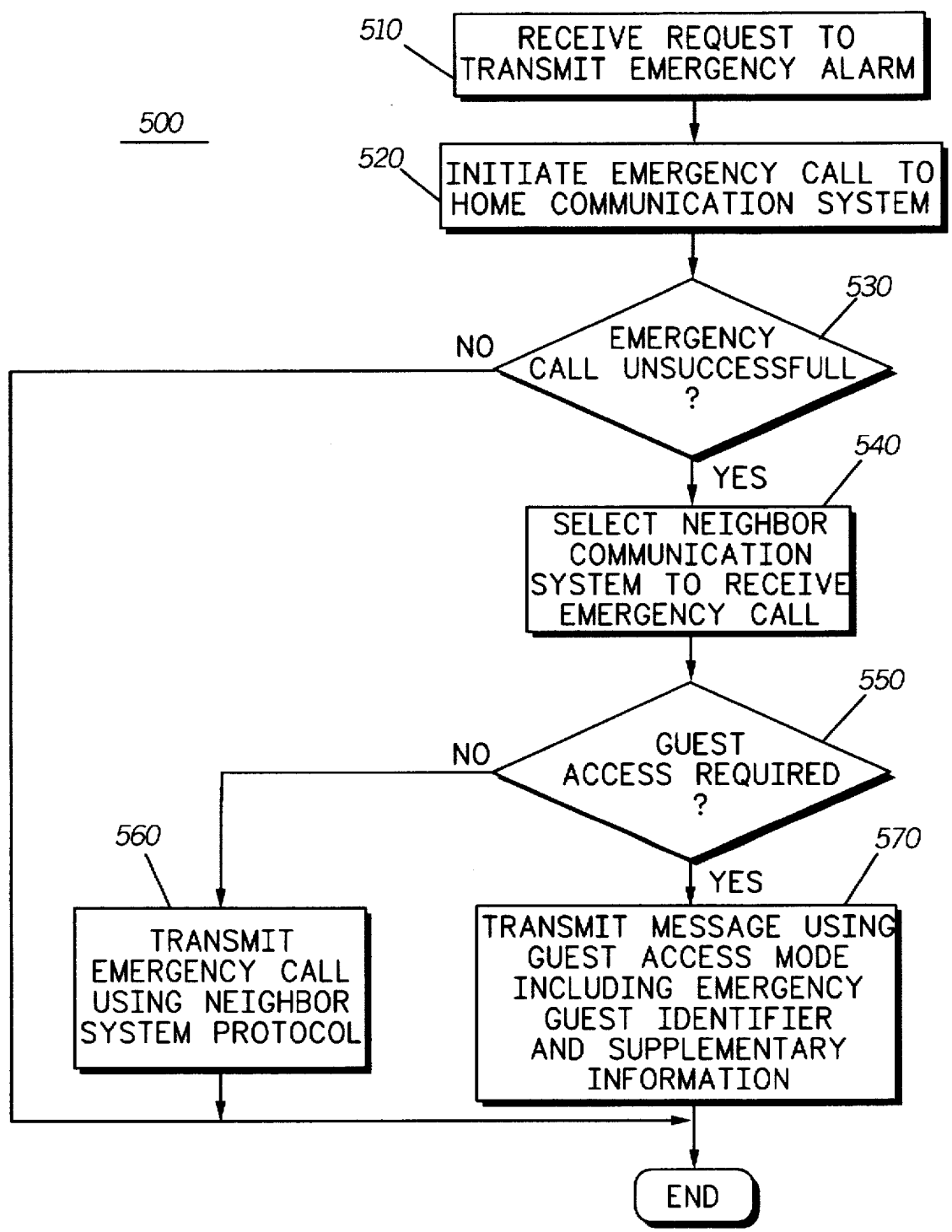
FIG. 5 is a flowchart of procedures for operating the transceiver of FIG. 3 to enable emergency alarm support, in accordance with the present invention.

FIG. 5 is a flowchart of procedures 500 executed at the subscriber unit to process a request for an emergency alarm call, in accordance with the present invention. The subscriber unit receives a request to transmit an emergency alarm call using a preferred communication resource, step 510. Generally, the preferred communication resource represents a particular emergency channel on the primary or home communication system of the subscriber unit. The emergency request may be initiated, for example, when a user depresses an emergency button on the subscriber unit, indicating a desire to transmit on a channel selected for emergency communication. The emergency call may be automatically initiated, such as by a man down switch. The subscriber unit then attempts to communicate the emergency call using the preferred communication resource, such as by initiating the emergency alarm call on its primary or home communication system, step 520.

According to the present invention, when the emergency alarm call to the primary communication system is not successful, the subscriber unit selects a secondary or neighbor communication system as a target recipient of the emergency alarm call, steps 530, 540. Preferably, the subscriber unit maintains a list of available secondary communication resources or systems for handling emergency calls. In the preferred embodiment, this list of available secondary resources is dynamically maintained and prioritized. The subscriber unit determines whether the secondary communication system selected provides support for emergency calls through a guest access mode, step 550. When such guest access mode is required, the subscriber unit uses a guest access protocol to transmit a message to the secondary communication system including the emergency alarm call and any supplementary information necessary to identify the source of the emergency alarm call, steps 550, 570. Preferably, such message includes a guest identifier and supplementary information that identifies the subscriber unit. In the preferred embodiment, the subscriber unit transmits as part of the message an emergency guest identifier, and a local identifier, which local identifier identifies the subscriber unit within its home or primary communication system. When a guest access mode is not applicable, the subscriber unit transmits the emergency call to the secondary communication system using a protocol appropriate to that system, steps 550, 560.

In one embodiment, the subscriber unit selects secondary communication systems for handling emergency calls based on a dynamically assigned priority. The emergency alarm call is transmitted to all such secondary communication systems to ensure that the emergency alarm call is received. Thus, when unable to complete an emergency alarm call using a preferred communication resource, the subscriber unit attempts to communicate the emergency call using each of the available secondary communication resources until the emergency alarm call is complete. The subscriber unit uses the emergency call acknowledge status 407 of its database 322 to track the status of completed emergency calls by recording acknowledges for the various systems.

Figure 6:
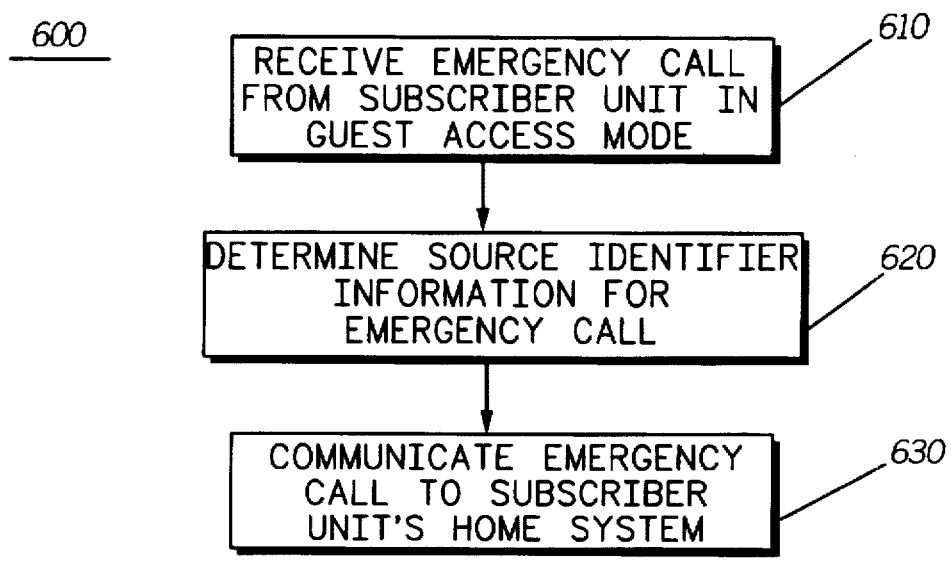
FIG. 6 is a flowchart of procedures used by a neighbor communication system to provide emergency alarm support using a guest access mode, in accordance with the present invention.

FIG. 6 is a flowchart of procedures 600 used at the neighbor communication system to provide emergency alarm support in guest access mode, in accordance with the present invention. In the preferred embodiment, the neighbor or secondary communication system maintains subscriber identification information for each subscriber unit operating on that system. Additionally, an emergency guest identifier is provided to collectively identify subscriber units operating on another communication system, which subscriber units are provided with emergency alarm call support.

In operation, the secondary communication system receives a message representing a emergency call from a subscriber unit in guest access mode, step 610, which subscriber unit is under operational control of its primary or home communication system. Preferably, the message includes an emergency guest identifier and/or any supplementary information needed to identify the subscriber unit. This guest identifier is associated with emergency calls originating from subscriber units operating within the primary communication system. Accordingly, the secondary communication system is able to determine source identification information for the emergency alarm call, step 620. The secondary communication system then communicates emergency information to the primary communication system including identification information based on the supplementary information, step 630. Preferably, the identification information includes source identification, such as a local identifier, for the subscriber unit originating the emergency alarm call.

The present invention provides for significant advantages over the prior art. By providing a guest access mode in a neighbor system, emergency alarm support is provided by that neighbor system without substantial administrative burden. A subscriber unit operating within a particular communication system thus has access to alternative communication resources for processing emergency alarm information. This increases the probability that an emergency alarm call will get an appropriate response.

What is claimed is:

1. In a communication environment having a subscriber unit operating within a first communication system that provides emergency alarm support, the subscriber unit being within communication range of a second communication system that provides emergency alarm support, the second communication system operating independently of the first communication system, a method comprising the steps of:

at the subscriber unit:
  selecting the second communication system as a target recipient of an emergency alarm call, as a backup to communicating the emergency alarm call to the first communication system;
  determining that the second communication system provides support for emergency alarm calls through a guest access mode; and
  transmitting a message to the second communication system, including the emergency alarm call, using the guest access mode, and supplementary information provides source identification information for the emergency alarm call;

at the second communication system:
  receiving the message from the subscriber unit, including the emergency alarm call in guest access mode, and the supplementary information;
  determining source identification information for the emergency alarm call; and
  communicating the emergency alarm call to the first communication system based on the source identification information.

2. The method of claim 1, further comprising, at the second communication system:
  providing a subscriber identifier for each of a plurality of subscriber units operating on the second communication system;
  providing an emergency guest identifier to collectively identify subscriber units operating on the first communication system.

3. The method of claim 2, wherein the step of transmitting a message to the second communication system, includes the step of, transmitting the emergency guest identifier as part of the message from the subscriber unit.

4. The method of claim 3, wherein the step of transmitting a message to the second communication system, includes the step of, transmitting a local identifier, which local identifier identifies the subscriber unit within the first communication system.

5. The method of claim 1, further comprising, at the subscriber unit, the step of maintaining a list of available secondary communication resources for handling emergency alarm calls, the list including the second communication system.

6. The method of claim 5, further comprising the steps of, at the subscriber unit:
  receiving a request to transmit an emergency alarm call using a preferred communication resource;
  attempting to communicate the emergency alarm call using the preferred communication resource; and
  when unable to complete the emergency alarm call using the preferred communication resource, attempting to communicate the emergency alarm call using each of the available secondary communication resources until the emergency alarm call is complete.

7. The method of claim 5, wherein the step of maintaining a list of available secondary communication resources, includes the step of dynamically prioritizing the list of available secondary communication resources.

8. A method of providing emergency alarm call support for a subscriber unit operating within a primary communication system, and having a neighbor communication system, operating independently of the primary communication system, within communication range of the subscriber unit, the method comprising the steps of:

at the subscriber unit:
  receiving a request to transmit an emergency alarm call to the primary communication system;
  initiating a transmission of the emergency alarm call to the primary communication system;
  when the emergency alarm call to the primary communication system is not successful:
    selecting the neighbor communication system as a target recipient of the emergency alarm call; and
    transmitting a message to the neighbor communication system, the message comprising a guest identifier, and supplementary information that identifies the subscriber unit;

at the neighbor communication system:
  receiving the message from the subscriber unit;
  associating the guest identifier with emergency alarm calls originating from subscriber units operating within the primary communication system; and communicating emergency information to the primary communication system including identification information based on the supplementary information.

9. The method of claim 8, wherein the step of transmitting a message to the neighbor communication system, includes the step of, transmitting a local identifier, which local identifier identifies the subscriber unit within the primary communication system.

10. The method of claim 8, further comprising, at the subscriber unit, the step of maintaining a list of available secondary communication resources for handling emergency alarm calls, the list including the neighbor communication system.

11. The method of claim 10, further comprising the step of transmitting the emergency alarm call, in succession, using each communication resource on the list of available secondary communication resources.

12. The method of claim 10, wherein the step of maintaining a list of available secondary communication resources, includes the step of dynamically prioritizing the list of available secondary communication resources.

13. In a transceiver operating on a primary communication system, a method of providing emergency alarm support, comprising the steps of:

identifying a preferred communication resource for handling emergency calls;

maintaining a list of available secondary communication resources for handling emergency alarm calls;

receiving a request to transmit an emergency alarm call;

initiating communication of the emergency alarm call using the preferred communication resource; and when unable to complete the emergency alarm call using the preferred communication resource:

(a) selecting a secondary communication resource from the list of available secondary communication resources; and (b) initiating transmission of the emergency alarm call using the secondary communication resource.

14. The method of claim 13, wherein the step of maintaining a list of available secondary communication resources, includes the step of dynamically prioritizing the list of available secondary communication resources.

15. The method of claim 14, wherein the step of selecting a secondary communication resource, comprises the step of selecting the secondary communication resource based on a dynamically assigned priority.

16. The method of claim 14, further comprising the step of repeating steps (a) and (b) for communication resources on the list of available secondary communication resources.

17. The method of claim 14, further comprising the step of transmitting the emergency alarm call, in succession, using each communication resource on the list of available secondary communication resources.

18. The method of claim 14, wherein the step of initiating transmission comprises the steps of:

determining that the secondary communication resource represents a system that provides support for emergency alarm calls through a guest access mode; and transmitting a message using the secondary communication resource, the message including the emergency alarm call, and supplementary information that provides source identification information for the emergency alarm call.

19. The method of claim 18, wherein the step of transmitting a message to the secondary communication resource, includes the step of, transmitting an emergency guest identifier as part of the message.

20. The method of claim 19, wherein the step of transmitting a message, includes the step of, transmitting a local identifier, which local identifier identifies the transceiver within the primary communication system.

* * * * *